(12) United States Patent
Reum et al.

(10) Patent No.: US 8,408,558 B2
(45) Date of Patent: Apr. 2, 2013

(54) ANNULAR SEAL HAVING A RIB

(75) Inventors: Rex Reum, Spokane, WA (US); Steven Douglas Hudlet, Hayden, ID (US); Timothy J. Rammel, Spokane, WA (US)

(73) Assignee: Jetseal, Inc., Spokane, WA (US)

( * ) Notice: Subject to any disclaimer, the term of this patent is extended or adjusted under 35 U.S.C. 154(b) by 313 days.

(21) Appl. No.: 12/167,368

(22) Filed: Jul. 3, 2008

(65) Prior Publication Data

US 2009/0026715 A1    Jan. 29, 2009

Related U.S. Application Data

(60) Provisional application No. 60/947,825, filed on Jul. 3, 2007.

(51) Int. Cl.
*F16J 15/02* (2006.01)
*F16L 17/03* (2006.01)

(52) U.S. Cl. .......................... 277/644; 277/615

(58) Field of Classification Search .................. 277/607, 277/615, 644
See application file for complete search history.

(56) References Cited

U.S. PATENT DOCUMENTS

| | | | | | |
|---|---|---|---|---|---|
| 2,239,641 | A | * | 4/1941 | Bierend | 277/607 |
| 3,345,078 | A | * | 10/1967 | Bialkowski | 277/647 |
| 3,909,019 | A | * | 9/1975 | Leko | 277/649 |
| 4,214,763 | A | * | 7/1980 | Latham | 277/614 |
| 4,408,771 | A | * | 10/1983 | Shelton | 277/643 |
| 4,477,093 | A | | 10/1984 | Adamek | |
| 4,709,933 | A | | 12/1987 | Adamek et al. | |
| 5,058,906 | A | * | 10/1991 | Adamek et al. | 277/614 |
| 5,355,908 | A | * | 10/1994 | Berger et al. | 137/614.04 |
| 5,872,323 | A | | 2/1999 | Norton et al. | |
| 6,494,463 | B1 | * | 12/2002 | Rank | 277/607 |
| 6,561,521 | B2 | * | 5/2003 | Janoff et al. | 277/603 |

FOREIGN PATENT DOCUMENTS

WO    2006/015324    2/2006

\* cited by examiner

*Primary Examiner* — Vishal Patel
(74) *Attorney, Agent, or Firm* — Fish & Associates, PC

(57) ABSTRACT

An annular seal for use in sliding or translating applications is provided. An annular can comprises a metallic material formed into a ring. One or more ribs are disposed about an inner surface or an outer surface wall of the ring where the ribs provide a sliding sealing surface smaller having a reduced contact area relative to the width of the ring wall. The sliding sealing surface provides a seal against one or more sliding members. The rib-wall structure forms a circular beam providing greater structural integrity to the seal than would otherwise be possible.

20 Claims, 2 Drawing Sheets ing application having Ser. No. 60/947,825 filed Jul. 3, 2007 which is incorporated herein by reference in its entirety.

ANNULAR SEAL HAVING A RIB

This application claims the benefit of priority to U.S. provisional application having Ser. No. 60/947,825 filed Jul. 3, 2007 which is incorporated herein by reference in its entirety.

FIELD OF THE INVENTION

The field of the invention is sealing technology for fluid or gas cylinders.

BACKGROUND

Annular seals for pistons, gas cylinders, or other applications where surfaces slide against each other often suffer from numerous issues. Current seals lack sufficient structural support to resist flexing, which can cause the seal to wear out quickly especially in high temperature applications (e.g., greater than 350 degrees Celsius). In addition the sealing surface of current seals can cause excessive wear against an adjacent sliding member due to an overly broad contact area.

What has yet to be appreciated is an annular seal can be constructed to have high structural support while also limiting the contact of a sliding sealing surface (e.g., an outer cylindrical surface of the seal). For example, seals can be constructed where a rib is disposed on the outer wall of the seal. The rib provides a sealing surface having a reduced contact area and the rib-wall assembly forms a beam structure providing greater structural integrity to the annular seal.

Annular seals have been discussed in the past. U.S. Pat. No. 4,770,093 to Adamek and U.S. Pat. No. 4,709,933 to Adamek et al., both discuss fire resistant seals. However, the contemplated seals are stationary and are not adapted to provide a rib having sliding sealing surface. U.S. Pat. No. 5,872,323 to Norton et al. describes a ring-shaped piston seal for use in a firearm that lacks a rib structure. International patent application WO 2006/015324 to Liepold et al. discloses a sealing joint between two mutually moveable members using deformable ribs that insert into channels. However, the Liepold approach cannot be used in translating applications where a seal must slide or translate against an adjacent member. The above and other existing seals represent contemplated designs that lack the ability to scale from small applications having scales measured in tenths of an inch (e.g., small piston engines) to large applications having scales of approximately 10 feet (e.g., industrial gas turbine engines).

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for annular seal that scales from small applications to larger applications.

SUMMARY OF THE INVENTION

The present invention provides apparatus, systems and methods in which an annular ring can be used to provide a seal between at least two sliding members. Preferred annular seals comprise a circumferentially disposed rib that protrudes from an inner surface or outer surface of a seal wall to provide a sliding sealing surface against an adjacent sliding member. The sealing surface of the rib preferably has a width of less than 50% of the width of the seal wall, or more preferably less than 20% of the width of the seal wall. In some embodiments, more than one contemplated rib can be dispose on a surface of the annular seal.

In a preferred embodiment, seals are formed from metallic material including phosphor bronze or a bearing material. Example bearing materials can include a Babbitt metal or can include bronze.

Contemplated seals are configured to operate at high temperatures and under pressure. The seals preferably maintain integrity at temperatures as high as 350 degrees Celsius, or more preferably as high as 500 degrees Celsius. Additionally, seals are configured to maintain integrity at pressures up to 150 PSI, or as high as 2000 PSI.

Various objects, features, aspects and advantages of the inventive subject matter will become more apparent from the following detailed description of preferred embodiments, along with the accompanying drawings in which like numerals represent like components.

DETAILED DESCRIPTION

Figure 1A:
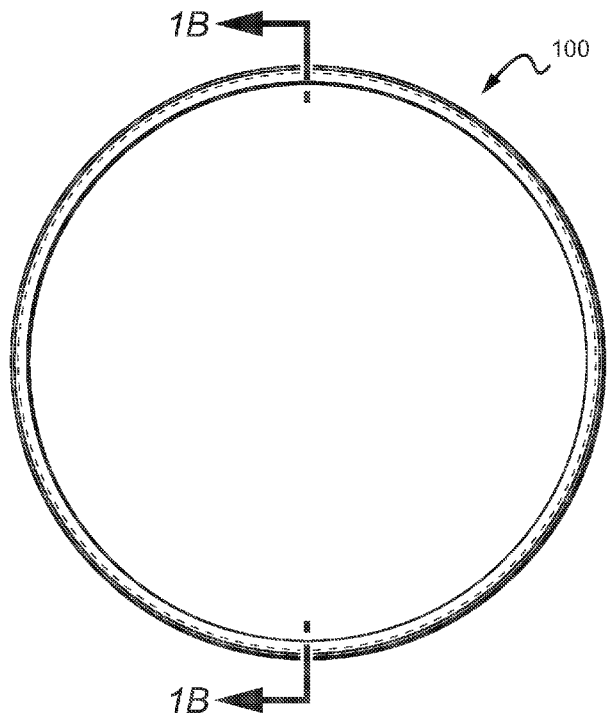
FIG. 1A is a top view of an annular seal having a rib.
Figure 1B:
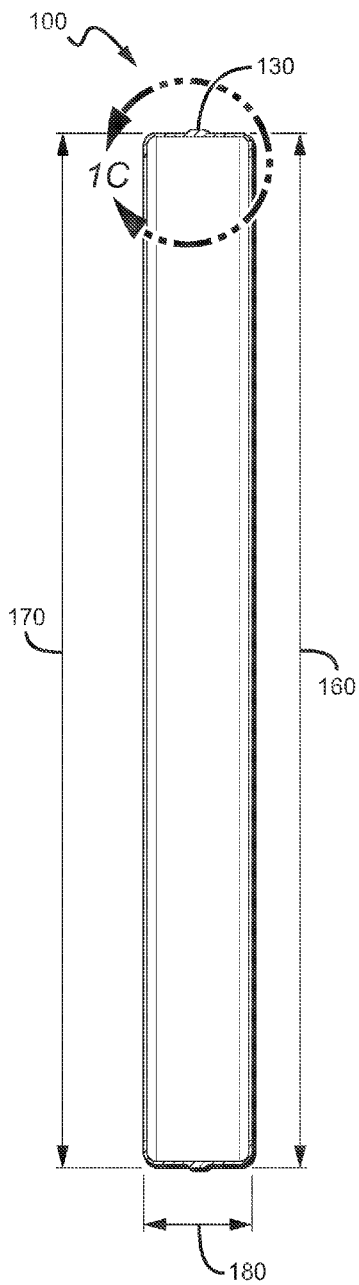
FIG. 1B is a side view of the rib of the annular seal from FIG. 1A.
Figure 1C:
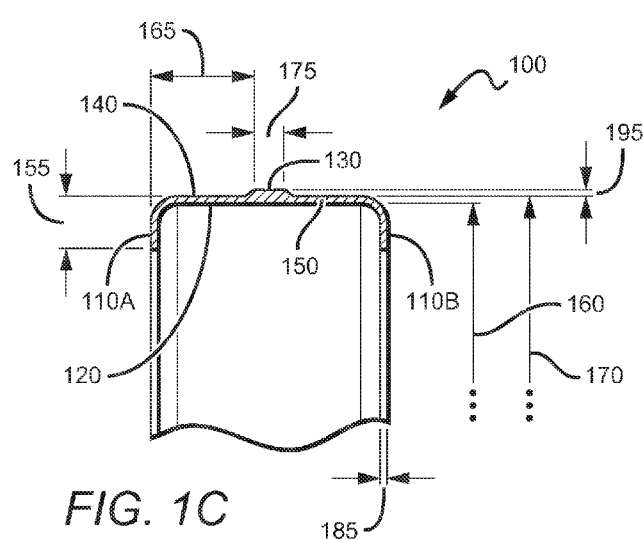
FIG. 1C is a close-up view of a portion of the annular seal from FIG. 1B.

In FIGS. 1A-1C, example seal 100 comprises an annular ring having an outer diameter 170, an inner diameter 160, and a wall width 180. In the example shown, rib 130 is disposed around the circumference of an outer cylindrical surface wall of seal 100.

Seal 100 comprises an open core allowing seal 100 to be placed into a ring-shaped seal receptacle. For example, seal 100 can be placed on the head of a piston, which can extend into the open core of seal 100.

A seal 100 that targets high temperature applications is preferably formed from a metallic material. Metallic materials include phosphor bronze or a bearing material. Preferred bearing materials can also include bronzes or a Babbitt metal. Using a metallic material allows seal 100 to tolerate high-temperature applications while also being robust at expected pressures. Although a preferred seal 100 comprises a metallic material, it is also contemplated that the material can be adjusted to suit a target application (e.g., a ceramic material). Metallic materials ensure seal 100 can operate in temperature ranges from −60 degrees Celsius up to 350 degrees Celsius or, more preferably up to 500 degrees Celsius. Furthermore, metallic material allows seal 100 to operate at pressures up to 150 PSI, or more preferably up to 2000 PSI.

Seal 100 can be sized and dimensioned according requirements for various applications ranging from small engines to large applications (e.g., a nuclear containment cover having an outer diameter of about 12 feet). A preferred seal 100 includes at least one of rib 130. The outer diameter 170 of seal 100 can reasonably range from 0.1 inches to 12 feet depending on the size a target receiving area. More preferred outer diameters range from 0.25 inches to 10 feet. Inner diameter 160 can be adjusted as necessary to provide an acceptable seal against a receiving area. Width 180 of the wall of seal 100 can also be adjusted as necessary to fit an application, although a preferred width is in the range of 0.1 inches to about 6 inches, with a more preferred range of about 0.2 inches to 5 inches. Unless the context dictates the contrary, all ranges set forth herein should be interpreted as being inclusive of their endpoints.

FIG. 1B presents a detailed view of rib 130 located on outer cylindrical surface 140 of exemplary seal 100. Rib 130 protrudes from a surface of wall 150, preferably outer surface 140 or inner cylindrical surface 120. In a preferred embodiment rib 130 is circumferentially disposed around the surface of wall 150 and is coaxial with both inner surface 120 and outer surface 140.

Rib 130 is preferably positioned at a distance 165 from the edge of wall 150 where the distance 165 can be determined based on the desired structural support required. A preferred distance 165 places the centerline of rib 130 at a midpoint of the width 180 of wall 150. In embodiments having a plurality of ribs, the ribs are preferably distributed along the surface of wall 150 to distribute a load evenly among the ribs. It is also contemplated that seal 100 could have rib 130 placed in uneven positions that would result in a non-uniform distribution of ribs.

Rib 130 has a width 175 that determines a contact area representing a sliding sealing surface that seals against a sliding member an assembly. For example, the width of rib 130 could seal against an engine block, or possibly a piston. Preferably width 175 is less than 50% of the width 180 of seal 100 to reduce the amount of contact with the sliding member relative to the contact area that would ordinarily be provided by wall 150. More preferred rib widths are less than 20% of the width 180. Limiting the contact area of seal 100 via the sliding surface of rib 130 reduces wear on an adjacent sliding member and on seal 100.

Rib 130 protrudes a distance 195 from the surface of wall 150. Preferred protrusion distances are less than 2 inches and more preferably less than 1 inch. For smaller applications, distance 195 can be on the order of 0.01 inches and for larger application distance 195 can be on the order of 2 inches. Distance 195 is also preferably less than rib width 175 (e.g., where distance 195 is less than 50% of 175) to ensure that rib 130 retains its approximate shape and does not substantially flex beyond desirable limits during operation as it slides against an adjacent member. Preferably, distance 195 is determined as a function of one or more parameters associated with the seal to provide structural integrity, as opposed to merely being a design choice. Contemplated parameters include rib width 175, material properties from which the seal is made (e.g., tensile strength, etc. . . . ), the outer diameter 170 of the seal, thickness of the seal wall, or other seal parameters.

Outer surface 140 and inner surface 120 define wall 150 of seal 100. In some embodiments, wall 150 can be extended to form ringed flanges 110A and 110B having a flange thickness 185. Flanges 110A and 110B both preferably couple to the inner surface 120 and outer surface 140 via wall 150 and extend inward toward an axis of seal 100. It is also contemplated that flanges 110A or 110B can provide a sealing surface against one or more sliding members.

Although rib 130 is shown on outer surface 140, it should be appreciated that one or more of rib 130 can also be disposed on inner surface 120 while still falling within the scope of the inventive subject matter.

An astute reader will recognize that rib 130 and wall 150 forms a circular beam having an approximate "T" cross-sectional shape. The circular beam structure provides several advantages. First, wall 150 of seal 100 is strengthened against deformation via the beam structure. Second, the sealing surface provided by rib 130 has a reduced sliding surface area of contact against a sliding member which reduces wear on both the seal and the sliding member. A result of such a configuration includes the seal having a greater life expectancy.

Figure 3:
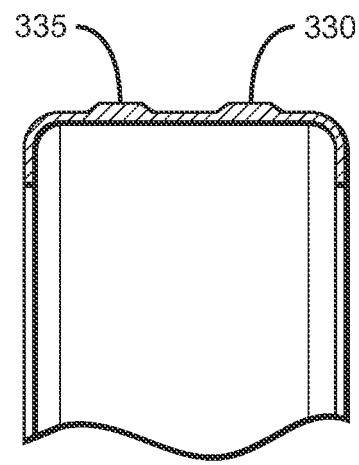
FIG. 3 is a close-up view of a portion of an annular seal having two ribs.

One should appreciate that multiple ribs having varying widths according to the above discussion can be added to outer surface 140 or inner surface 120. FIG. 3 shows a seal having a first rib 330 and a second rib 335, which have been configured to distribute the load across wall 350.

Figure 2:
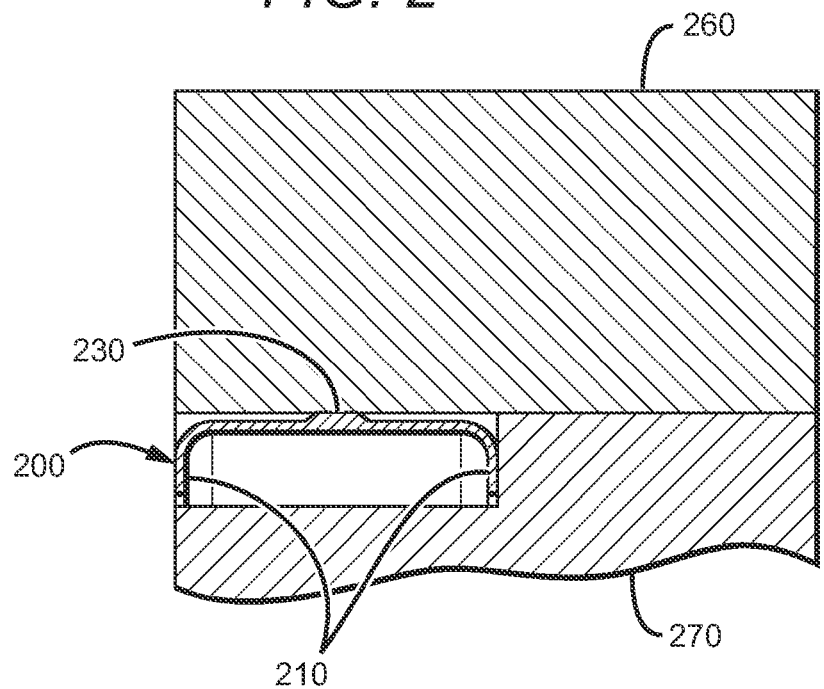
FIG. 2 is a schematic of an annular seal providing a seal between two sliding members.

In FIG. 2, seal 200 has been placed in a seal receiving area among sliding members 260 and 270. Seal 200 seals against sliding member 270 through one of flanged rings 210 and also contacts sliding member 260 at the sliding sealing surface of rib 230. As sliding members 260 and 270 slide relative to each other, rib 230 slides against sliding member 260.

A contemplated application for seal 200 includes coupling seal 200 to a piston (sliding member 270) within a double acting high temperature cylinder (sealing member 260). Other contemplated sliding or translating applications include using the seal within pumps, couplings, or valves.

As previously discussed, one possible use for an annular seal includes a seal for a small application, possibly within a double acting high temperatures cylinder similar to that shown in FIG. 2 or other non-rotary applications. Approximate properties of such an example seal for small applications are listed in Table 1.

TABLE 1

| Seal Property | Value |
| --- | --- |
| Outer Diameter | 2.363 inches |
| Inner Diameter | 2.622 inches |
| Sea 1 Width | 0.252 inches |
| Rib Protrusion | 0.007 inches |
| Rib Position | 0.111 inches |
| Rib Width | 0.030 inches |
| Flange Thickness | 0.007 inches |
| Flange Width | 0.056 inches |
| Material | Phosphor Bronze |
| Max Temp. Tolerance | 350 degrees C. |
| Max Pres. Tolerance | 150 PSI |

One should note the dimensions of one or more ribs disposed around the seal are not mere design choices. Rather, the dimensions of each property contribute to the over all structural support of the seal (e.g., resistance to flexing, stiffness, etc. . . . ) and extends the life expectancy of the seal. Still the rib properties can be adjusted to fit a target application while still falling within the scope of the inventive subject matter. For example, the following parameters of the rib can be adjusted: the rib position, rib width, rib protrusion, or the number of ribs.

One skilled in the art will recognize the scale of a contemplated seal can range from small applications as described in Table 1 to large applications having large dimensions. For example, contemplated seals can be deployed in covers for nuclear containment or industrial gas turbine engines where the seals have outer diameter of 10 to 12 feet. Ribs for large application seals could have a rib width on the order of 1 to 3 inches, or rib protrusions of up to 2 inches.

Several advantages, among others, of the disclosed inventive subject matter are clear. First, the contemplated seal comprises greater structural integrity due to the rib-wall beam structure allowing the seal to operate over a greater life time. Second, the limited contacting sealing surface of the rib reduces wear on adjacent sliding members. Third, the contemplated seal can be formed as a single, contiguous piece without requiring additional parts, an o-ring or other additional sealing body for example. It should also be noted that the contemplated seal has a reduced cost over the lifetime of the part.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An annular seal for use between a first and a second sliding member, the seal comprising:
    an annular ring formed of a metallic material, where the annular ring is sized and dimensioned to have:
        (a) an inner cylindrical surface coaxial with an outer cylindrical surface,
        (b) a width (W) in the range from 0.1 inches to 6 inches, and
        (c) an outer diameter (OD) in the range from 0.1 inches to 12 feet;
    a rib protruding from and circumferentially disposed on the outer surface wherein the rib has a surface that is configured to provide a sliding sealing surface with one of the first and the second sliding members, and wherein the surface of the rib has a rib width (RW) of less than 50% of the width (W);
    a first flange and a second flange extending approximately 90 degrees from the inner surface and wherein the first and second flanges each have a thickness that is substantially different than the rib width; and
    wherein the first flange and second flange have ends, each end having a surface coaxial with the inner cylindrical surface that is configured to provide a sliding sealing surface with one of the first and second sliding members.

2. The seal of claim 1, wherein the outer diameter (OD) is in the range of 0.25 inches and 10 feet.

3. The seal of claim 1, wherein the rib width (RW) is less than 20% of the width (W).

4. The seal of claim 1, wherein the rib protrudes no more than about 2 inches.

5. The seal of claim 4, wherein the rib protrudes no more than about 1 inch.

6. The seal of claim 1, wherein the rib is coaxial with the inner and the outer surfaces.

7. The seal of claim 1, further comprising a second rib protruding from and circumferentially disposed on at least one of the inner surface and the outer surface wherein the second rib provides a second sealing surface with one of the first and the second sliding members, and wherein the second sealing surface of the rib has a second rib width (SRW) of less than 20% of the width (W).

8. The seal of claim 1, wherein the metallic material comprises phosphor bronze.

9. The seal of claim 1, wherein the metallic material comprises a bearing material.

10. The seal of claim 9, wherein the bearing material is a Babbitt metal.

11. The seal of claim 9, wherein the bearing material comprises bronze.

12. The seal of claim 1, wherein the seal is configured to maintain integrity at temperatures up to 500 degrees Celsius.

13. The seal of claim 12, wherein the seal is configured to maintain integrity at temperatures up to 350 degrees Celsius.

14. The seal of claim 1, wherein the seal is configured to maintain integrity at pressures up to 2000 PSI.

15. The seal of claim 14, wherein the seal is configured to maintain integrity at pressures up to 150 PSI.

16. The seal of claim 1, wherein the annular ring and rib comprise a single unit forming a circular beam.

17. The seal of claim 16, wherein the circular beam comprises an approximate "T" cross-sectional shape and is formed as a single work piece.

18. The seal of claim 1, wherein the first and second flanges each have a width that is greater than the rib width.

19. The seal of claim 1, wherein the first and second flanges each have a thickness that is substantially equal to a thickness of the seal.

20. A sliding seal system comprising:
    first and second sliding members;
    an annular ring formed of a metallic material, where the annular ring is sized and dimensioned to have:
        (a) an inner cylindrical surface coaxial with an outer cylindrical surface,
        (b) a width (W) in the range from 0.1 inches to 6 inches, and
        (c) an outer diameter (OD) in the range from 0.1 inches to 12 feet;
    a rib protruding from and circumferentially disposed on the outer surface wherein the rib has a surface that is configured to provide a sliding sealing surface with one of the first and the second sliding members, and wherein the surface of the rib has a rib width (RW) of less than 50% of the width (W);
    a first flange and a second flange extending approximately 90 degrees from the inner surface and wherein the first and second flanges each have a thickness that is substantially different than the rib width; and
    wherein the first flange and second flange having ends, each end having a surface coaxial with the inner cylindrical surface that is configured to provide a sliding sealing surface with one of the first and second sliding members.

* * * * *